United States Patent
Jeong et al.

(10) Patent No.: US 9,341,767 B2
(45) Date of Patent: May 17, 2016

(54) DISPLAY DEVICE

(71) Applicant: Samsung Display Co., Ltd., Yongin, Gyeonggi-Do (KR)

(72) Inventors: SeongKoo Jeong, Cheonan-si (KR); Jeong-Ki Kim, Asan-si (KR); Sang Sik Yang, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 107 days.

(21) Appl. No.: 13/757,118

(22) Filed: Feb. 1, 2013

(65) Prior Publication Data

US 2014/0085932 A1 Mar. 27, 2014

(30) Foreign Application Priority Data

Sep. 21, 2012 (KR) ........................ 10-2012-0105396

(51) Int. Cl.
*F21V 8/00* (2006.01)
(52) U.S. Cl.
CPC ............ *G02B 6/0091* (2013.01); *G02B 6/0093* (2013.01)
(58) Field of Classification Search
CPC ............................. G02B 6/0093; G02B 6/0091
USPC .................................. 362/612, 613, 632–634
See application file for complete search history.

(56) References Cited

U.S. PATENT DOCUMENTS

| | | | | |
|---|---|---|---|---|
| 5,552,907 | A * | 9/1996 | Yokota et al. | 349/62 |
| 7,382,423 | B2 * | 6/2008 | Chang et al. | 349/64 |
| 7,441,938 | B2 * | 10/2008 | Sakai et al. | 362/634 |
| 8,009,244 | B2 | 8/2011 | Toriyama et al. | |
| 2008/0239754 | A1 * | 10/2008 | Kang et al. | 362/617 |
| 2011/0103093 | A1 * | 5/2011 | Tsai et al. | 362/612 |
| 2011/0116015 | A1 * | 5/2011 | Yakura et al. | 349/67 |
| 2012/0062816 | A1 * | 3/2012 | Tsubaki | 349/61 |
| 2012/0081918 | A1 | 4/2012 | Yang et al. | |
| 2012/0195069 | A1 * | 8/2012 | Yeh et al. | 362/612 |
| 2012/0281151 | A1 * | 11/2012 | Abe | 348/739 |
| 2013/0010455 | A1 * | 1/2013 | Sakamoto et al. | 362/97.1 |
| 2013/0033657 | A1 * | 2/2013 | Li et al. | 349/60 |

FOREIGN PATENT DOCUMENTS

| | | |
|---|---|---|
| JP | 2008166010 A | 7/2008 |
| JP | 2009224301 A | 10/2009 |
| KR | 1020070083108 A | 8/2007 |
| KR | 1020090077125 A | 7/2009 |
| KR | 1020110006957 A | 1/2011 |
| KR | 1020110094597 A | 8/2011 |
| KR | 1020110134029 A | 12/2011 |

* cited by examiner

*Primary Examiner* — Evan Dzierzynski
*Assistant Examiner* — Christopher E Dunay
(74) *Attorney, Agent, or Firm* — Innovation Counsel LLP (57) ABSTRACT

A display device includes a display panel, a backlight unit, a support member, a protection member and a spacing member. The backlight unit includes a printed circuit board on which light emitting blocks are mounted and a light guide. The spacing member presses the printed circuit board against the support member and uniformly maintains spaces between light output surfaces of the light emitting blocks and a light input surface of the light guide.

10 Claims, 12 Drawing Sheets

DISPLAY DEVICE

CROSS-REFERENCE TO RELATED APPLICATIONS

This U.S. non-provisional patent application claims priority under 35 U.S.C. §119 to Korean Patent Application No. 10-2012-0105396, filed on Sep. 21, 2012, the entire contents of which are hereby incorporated by reference.

BACKGROUND

The present inventive concept herein relates to display devices, and more particularly, to a display device having an improved display quality.

Examples of display devices are a transparent display device, a semitransparent display device and a reflection-type display device. The transparent display device and the semitransparent display device include a display panel and a backlight unit supplying light to the display panel.

The backlight unit includes a light source generating light and a light guide guiding the light received from the light source to the display panel. The light source includes a printed circuit board and a plurality of light emitting blocks mounted on the printed circuit board. The plurality of light emitting blocks face a light input surface of the light guide.

SUMMARY

A display device Is provided. The display device may include a light source including a printed circuit board including at least one first insertion groove and a plurality of light emitting blocks mounted on the printed circuit board; a light guide guiding light received from the light source; a display panel receiving the guided light from the light guide to generate an image; a first support member including a first bottom portion and a first sidewall portion that is bent from the first bottom portion and includes a second insertion groove overlapping the first insertion groove; a protection member comprising a second bottom portion supporting the first bottom portion and a third insertion groove that overlaps the second insertion groove; and a spacing member including a portion that is inserted into the first insertion groove, the second insertion groove and the third insertion groove, the spacing member uniformly maintaining spaces between the light output surfaces of the light emitting blocks and a light input surface of the light guide.

In another aspect, the display device may include a light source including a printed circuit board including at least one first opening and a plurality of light emitting blocks mounted on the printed circuit board; a light guide guiding light received from the light source; a display panel receiving the guided light from the light guide to generate an image; a support member comprising a second opening that overlaps the first opening while supporting the printed circuit board; a protection member comprising a bottom portion supporting the support member and a sidewall portion bent from the bottom portion; and a spacing member including a portion that is inserted into the first insertion groove and the second insertion groove, the spacing member uniformly maintaining spaces between the light output surfaces of the light emitting blocks and a light input surface of the light guide.

BRIEF DESCRIPTION OF THE FIGURES

Example embodiments will be described below in more detail with reference to the accompanying drawings. The embodiments may, however, be embodied in different forms and should not be constructed as limited to the embodiments set forth herein. Rather, these embodiments are provided so that this disclosure will convey the scope of the inventive concept to those skilled in the art. Like numbers refer to like elements throughout.

DETAILED DESCRIPTION OF THE EMBODIMENTS

Example embodiments will be described more fully hereinafter with reference to the accompanying drawings, in which the example embodiments are shown. This inventive concept may, however, be embodied in many different forms and should not be construed as limited to the example embodiments set forth herein. Rather, these embodiments are provided so that this disclosure will convey the scope of the inventive concept to those skilled in the art. In the drawings, the size and relative sizes of layers and regions may be exaggerated for clarity. Like numbers refer to like elements throughout.

Figure 1:
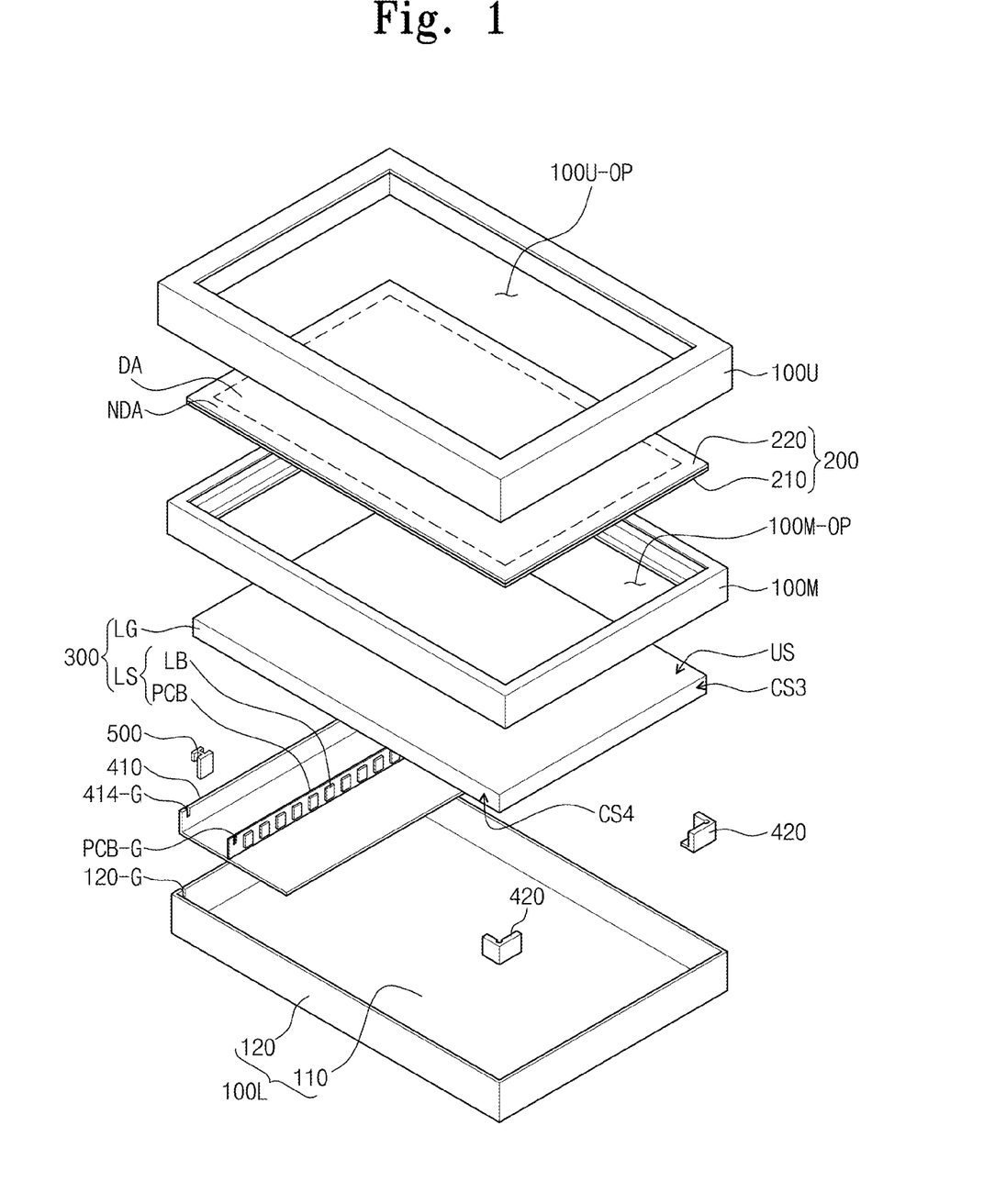
FIG. 1 is a through perspective view of display device in accordance with some embodiments.
Figure 2:
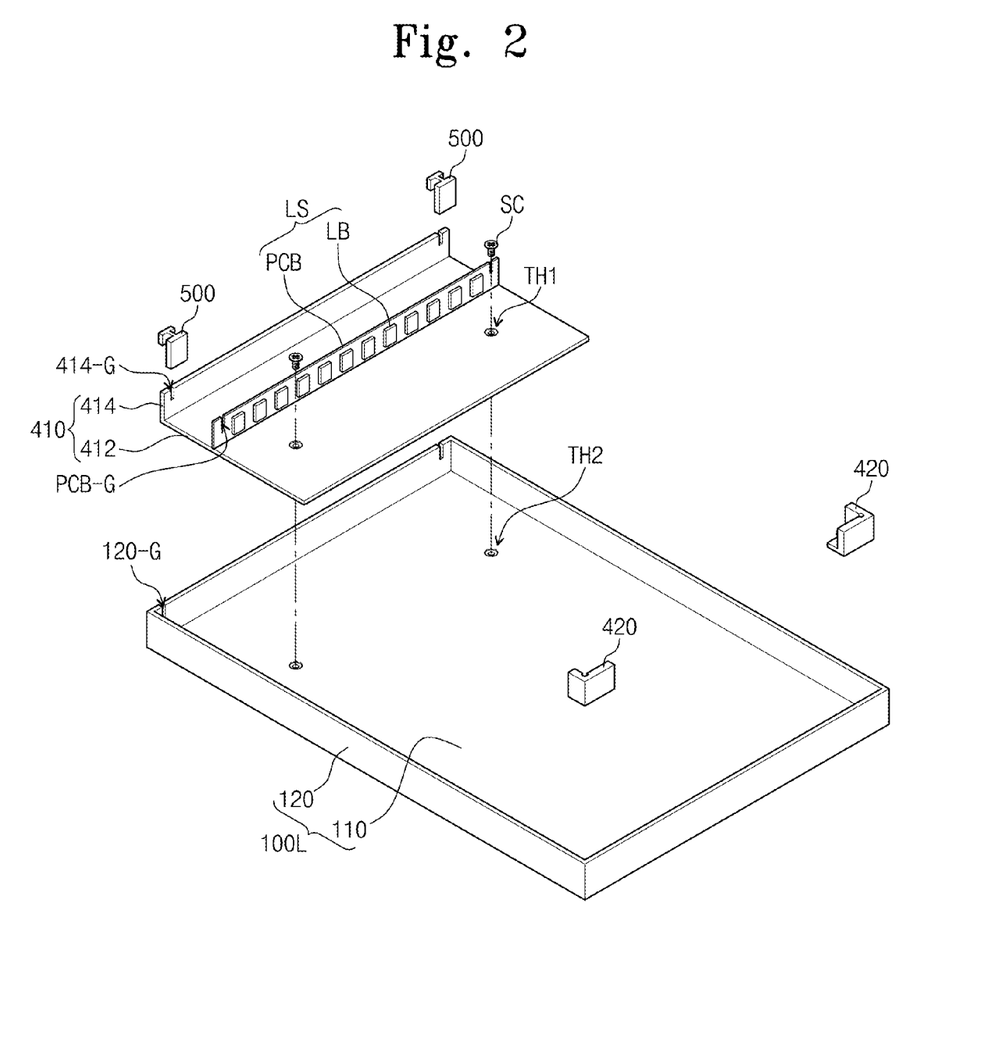
FIG. 2 is a through perspective view of some parts of the display device illustrated in FIG. 1.
Figure 3:
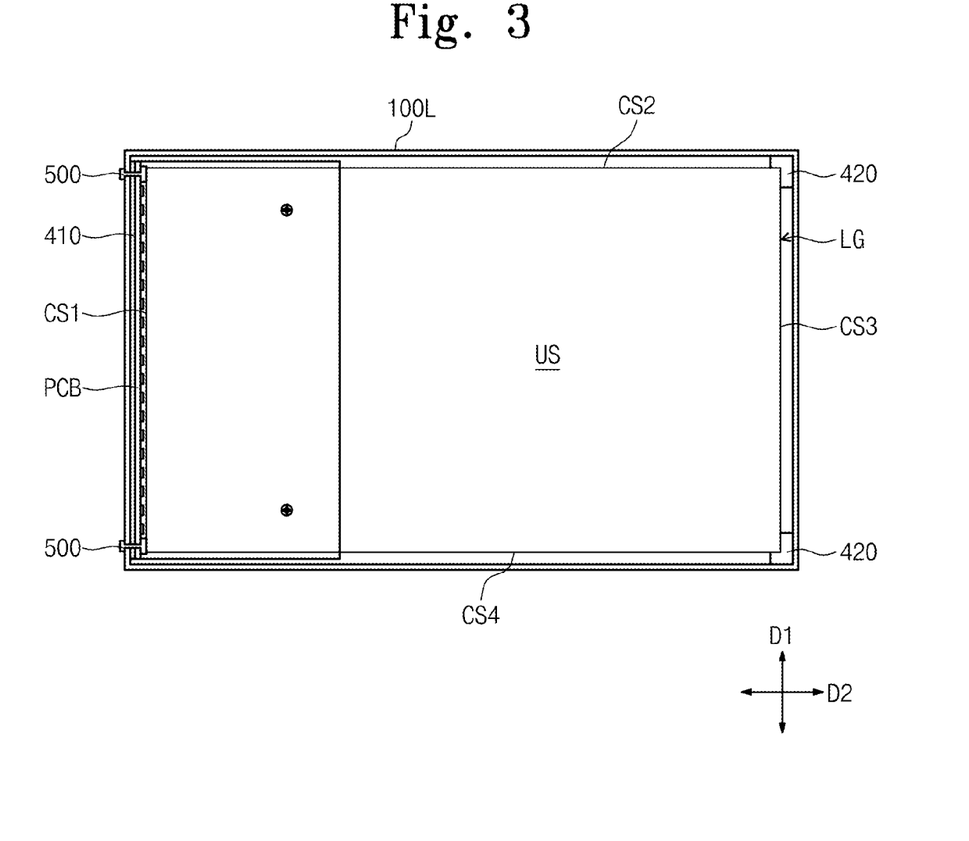
FIG. 3 is a top plan view illustrating a state that some parts illustrated in FIG. 2 are combined with one another.

FIG. 1 is a through perspective view of display device in accordance with some embodiments. FIG. 2 is a through perspective view of some parts of the display device illustrated in FIG. 1. FIG. 3 is a top plan view illustrating a state that some parts illustrated in FIG. 2 are combined with one another.

As illustrated in FIGS. 1 through 3, the display device includes a protection member (100U, 100L), a display panel 200, a backlight unit 300, a support member (410, 420) and a spacing member 500.

As illustrated in FIG. 1, the protection member (100U, 100L) includes an upper protection member 100U and a lower protection member 100L. The upper protection member 100U and the lower protection member 100L together forms an external surface of the display device and accommodate other constituent elements therein.

The upper protection member 100U is disposed on an upper side of the display panel 200. The upper protection member 100U includes an opening 100U-OP exposing a part of the display panel 200, for instance, a display area DA. The upper protection member 100U protects a non-display area NDA of the display panel 200. The non-display area NDA is adjacent to the display area DA, and an image is not generated in the non-display area NDA.

The lower protection member 100L is disposed on a lower side of the display panel 200. The lower protection member 100L includes a bottom portion 110 (hereinafter it is referred to as a first bottom portion) and a sidewall portion 120 (hereinafter it is referred to as a first sidewall portion) that is upwardly bent from the first bottom portion 110.

The first bottom portion 110 may have, for example, a square or rectangular shape. The first sidewall portion 120 is bent from four sides of the first bottom portion 110. The first sidewall portion 120 may be divided into four parts corresponding to the four sides of the first bottom portion 110.

The first sidewall portion 120 includes at least one insertion groove 120-G (hereinafter it is referred to as a first insertion groove). The first insertion groove 120-G is disposed at any one of four parts of the first sidewall portion 120. As illustrated in FIGS. 1 and 2, the two first insertion grooves 120-G may be disposed at both ends of any one of the four parts respectively. This is only one example, and it is sufficient for the first insertion groove 120-G to be disposed at a position that corresponds to the position of a second insertion groove PCB-G that will be described later.

The display device may further include a middle protection member 100M. The middle protection member 100M is disposed between the upper protection member 100U and the lower protection member 100L. The middle protection member 100M may be a frame of, for example, a rectangular shape that overlaps the non-display area NDA of the display panel 200. The middle protection member 100M includes an opening 100M-OP disposed inside the middle protection member 100M. The middle protection member 100M supports the display panel 200 at a lower side of the display panel 200.

The display panel 200 receives a light from the backlight unit 300 and generates an image. The display panel 200 is a transparent display panel or a semitransparent display panel. For example, the display panel 200 may be a liquid crystal display panel or an electrophoretic display panel. In the present example embodiment, a liquid crystal display panel including a first substrate 210 and a second substrate 220 is described.

The backlight unit 300 includes a light source LS generating light and a light guide LG guiding the light received from the light source to the display panel 200.

The light source LS includes a printed circuit board PCB and a plurality of light emitting blocks LB mounted on the printed circuit board PCB. The printed circuit board PCB includes an insulating layer (not shown) and an interconnection layer. The printed circuit board PCB has a shape extending along a light input surface CS1 (FIG. 3) of the light guide LG that will be described later. Each of the plurality of light emitting blocks LB includes a light emitting device such as, for example, a light emitting diode.

The light source LS may further include active devices which are mounted on the printed circuit board PCB to control the plurality of light emitting blocks LB. The plurality of light emitting blocks LB are connected to interconnections of the printed circuit board PCB respectively. The plurality of light emitting blocks LB receive an electrical signal. The electrical signal includes a power supply voltage and a dimming signal.

The printed circuit board PCB faces any one of four parts of the first sidewall portion 120. The printed circuit board PCB includes at least one insertion groove PCB-G (hereinafter it is referred to as a second insertion groove) that overlaps (i.e., aligns with) the first insertion groove 120-G. As illustrated in FIG. 2, the two second insertion grooves PCB-G may be disposed at both ends of the printed circuit board PCB respectively.

As illustrated in FIGS. 1 and 3, the light guide LG includes a first surface US and a second surface (not shown) facing the first surface US in a thickness direction of the light guide LG, and a plurality of connection surfaces CS1 through CS4 connecting the first surface US and the second surface. The light guide LG may be a plate of, for example, a rectangular shape.

Any one connection surface CS1 of the plurality of connection surfaces CS1 through CS4 faces the plurality of light emitting blocks LB. In the present example embodiment, the connection surface CS1 facing the plurality of light emitting blocks LB is defined as a light input surface. The other connection surface CS3 facing the light input surface CS1 is defined as a light facing surface.

The other connection surfaces CS2 and CS4 are defined as a first side CS2 and a second side CS4. The first side CS2 and the second side CS4 connect the light input surface CS1 and the light facing surface CS3 respectively and extend in a second direction D2 that crosses the first direction D1.

The first surface US is a surface through which a light that entered the light guide through the light input surface CS1 is output. The second surface (not shown) is a surface facing the first surface US in a thickness direction of the light guide LG.

The support member (410, 420) includes a first support member 410 and a second support member 420. The first support member 410 includes a bottom portion 412 (hereinafter it is referred to a second bottom portion) and a sidewall portion 414 (hereinafter it is referred to a second sidewall portion) bent from the second bottom portion 412 (FIG. 2).

The second bottom portion 412 supports a part of the light guide LG. The first support member 410 may be fixed to the lower protection member 100L. As illustrated in FIG. 2, the second bottom portion 412 may be fixed to the first bottom portion 110 by a screw SC. The screw SC is inserted into a first penetration hole TH1 of the second bottom portion 412 and a second penetration hole TH2 of the first bottom portion 110. The screw SC may alternatively be a bolt.

The second sidewall portion 414 faces any one part of the first sidewall portion 120. The second sidewall portion 414 includes at least one insertion groove 414-G (a third insertion groove) that overlaps (i.e., aligns with) the first insertion groove 120-G.

The second support member 420 supports the light guide LG. The display device may include a plurality of second support members 420. In FIGS. 1 through 3, the two second support members 420 are illustrated as an example.

The two second support members 420 are disposed between the light guide LG and the first sidewall portion 120. When viewed from a top plan view, the two second support members 420 are disposed so that the corners of the support members 420 correspond, i.e. fit into, the corners adjacent to the light facing surface CS3 of the light guide LG (the corners formed where CS3 meets CS2 on one side and CS4 on the other side).

One of the two second support members 420 is in contact with the second surface (not shown) of the light guide LG, the light facing surface CS3 and the first side CS2. The other is in contact with the second surface (not shown) of the light guide LG, the light facing surface CS3 and the second side CS4. The two second support members 420 may be formed of, for example, poly carbonate, plastic such as poly urethane or silicon.

The spacing member 500 uniformly maintains spaces between the light input surface CS1 and the plurality of light emitting blocks LB. As illustrated in FIG. 3, a part of the spacing member 500 is inserted into the first insertion groove 120-G, the second insertion groove PCB-G and the third insertion groove 414-G.

Figure 4A:
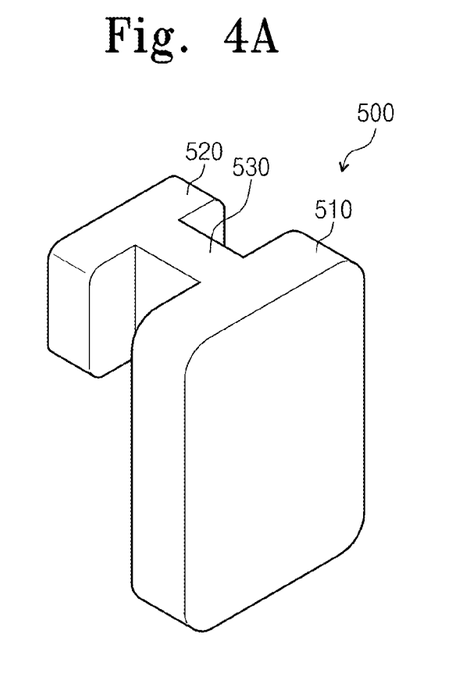
FIGS. 4A and 4B are perspective views of spacing members in accordance with some embodiments.
Figure 4B:
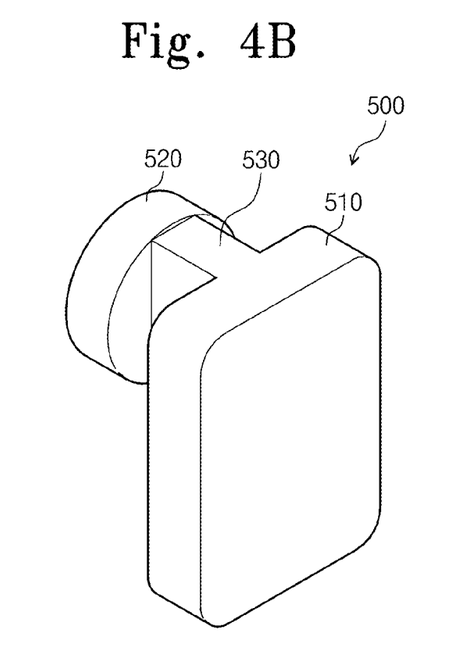

FIGS. 4A and 4B are perspective views of spacing members in accordance with some example embodiments.

Referring to FIGS. 4A and 4B, the spacing member 500 includes a contact portion 510, a fixing portion 520 and a connection portion connecting the contact portion 510 and the fixing portion 520. The spacing member 500 may be formed of, for example, poly carbonate, plastic such as poly urethane or silicon. The poly carbonate has a superior hardness as compared with other materials.

A shape of the contact portion 510 may be different from that of the fixing portion 520. As illustrated in FIG. 4A, the spacing member 500 may include the contact portion 510 and the fixing portion 520 that have different areas. As illustrated in FIG. 4B, the spacing member 500 may include the contact portion 510 of a square shape and the fixing portion 520 of a round shape. In other embodiments, a shape of the contact portion 510 may be the same as that of the fixing portion 520.

Figure 5A:
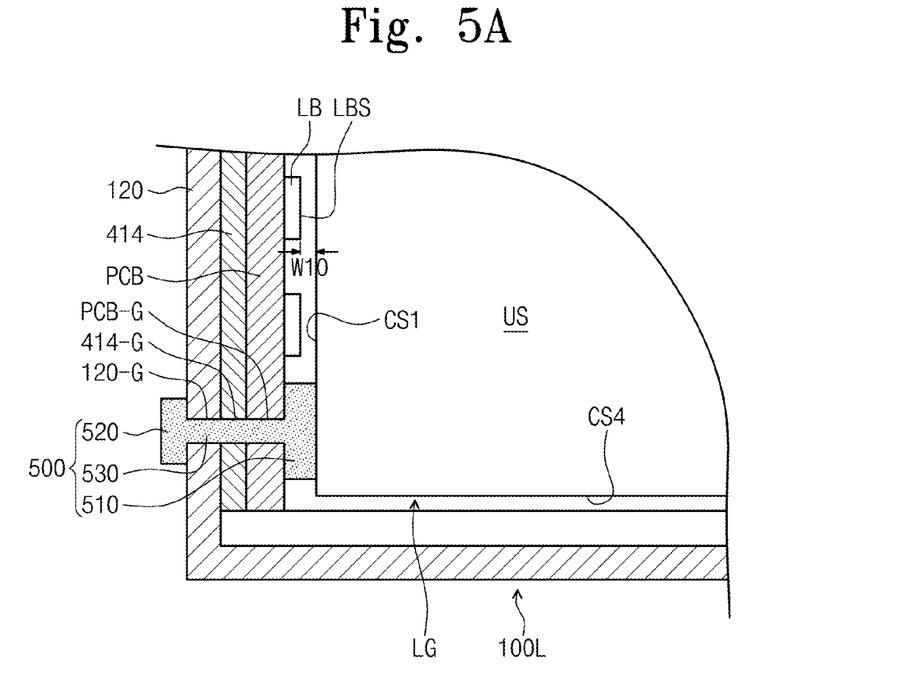
FIGS. 5A and 5B are enlarged drawings of some parts of FIG. 3.
Figure 5B:
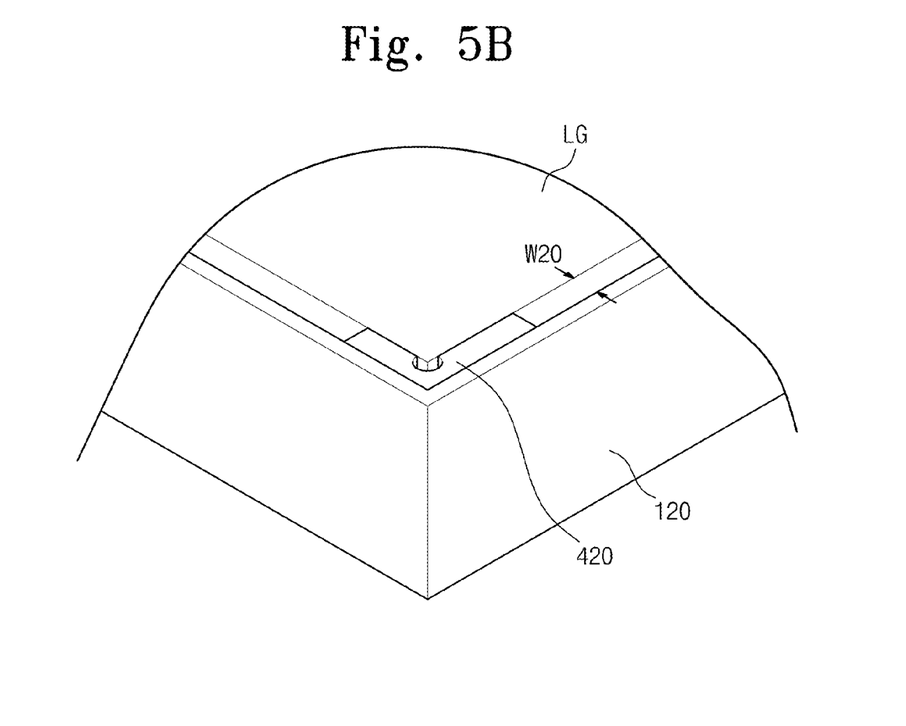

FIGS. 5A and 5B are enlarged drawings of some portions of FIG. 3. FIG. 5A is an enlarged top plan view of a portion at which the spacing member 500 is disposed, and FIG. 5B is an enlarged perspective view of a portion at which the second support member 420 is disposed.

As illustrated in FIG. 5A, the second sidewall portion 414 is in contact with the first sidewall portion 120. An external surface of the second sidewall portion 414 (a surface facing away from the light guide LG) is in contact with an internal surface of the first sidewall portion 120 (a surface facing toward the light guide LG). The printed circuit board PCB is in contact with the second sidewall portion 414. The printed circuit board PCB is in contact with an internal surface of the second sidewall portion 414 (a surface facing toward the light guide LG). The first sidewall portion 120 and the printed circuit board PCB are disposed with the second sidewall portion 414 between them. The external surface and the internal surface of each member mean a left surface and a right surface as illustrated in FIG. 5A respectively.

Each of light output surfaces LBS of the plurality of light emitting blocks LB is parallel to one surface of the first sidewall portion 120, one surface of the second sidewall portion 414 and one surface of the printed circuit board PCB. The contact portion 510 of spacing member 500 is in contact with the light input surface CS1 and one side of the printed circuit board PCB. A space W10 between the light input surface CS1 and the light output surfaces LBS of the plurality of light emitting blocks LB on the printed circuit board PCB is uniformly maintained by the contact portion 510.

The first insertion groove 120-G, the second insertion groove PCB-G and the third insertion groove 414-G are arranged in a row. Shapes of the first insertion groove 120-G, the second insertion groove PCB-G and the third insertion groove 414-G are, for example, identical to each other. The connection portion 530 of spacing member 500 is inserted into the first insertion groove 120-G, the second insertion groove PCB-G and the third insertion groove 414-G. An external pressure is used to insert the connection portion 530 into the first insertion groove 120-G, the second insertion groove PCB-G and the third insertion groove 414-G.

The fixing portion 520 protrudes from the first sidewall portion 120. A part of the fixing portion 520 is in contact with an external surface of the first sidewall portion 120. The spacing member 500 applies pressure to the first sidewall portion 120, the second sidewall portion 414 and the printed circuit board PCB. As a result, the printed circuit board PCB is pressed against the second sidewall portion 414. Without using a separate adhesive, the printed circuit board PCB can be fixed to the first support member 410.

In other embodiments, the connection portion 530 may be inserted into only any one of the first insertion groove 120-G, the second insertion groove PCB-G and the third insertion groove 414-G, or may be inserted into only the second insertion groove PCB-G and the third insertion groove 414-G.

As illustrated in FIG. 5B, the second support member 420 maintain a constant space W20 between the light guide LG and the first sidewall portion 120. The second support member 420 fixes the light guide LG together with the spacing member 500.

Although not separately illustrated in the drawing, the display device may further include an optical sheet or a reflection sheet to increase the efficiency that light is provided to the display panel 200.

The optical sheet is disposed between the light guide LG and the display panel 200. The optical sheet may include, for example, a prism sheet disposed on the light guide LG. The prism sheet performs a role of concentrating a light that is output from the first surface US in a direction perpendicular to a flat display surface of the display panel 200. A light that passed through the prism sheet vertically enters the display panel 200.

The optical sheet may further include a diffusion sheet diffusing a light that is output from the first surface US of the light guide LG. The diffusion sheet may be disposed between the light guide LG and the prism sheet.

The reflection sheet is disposed on a lower side of the light guide LG. The reflection sheet reflects a light that is leaking into the second surface (not shown) of the light guide LG to make the light enter the light guide LG again.

Figure 6A:
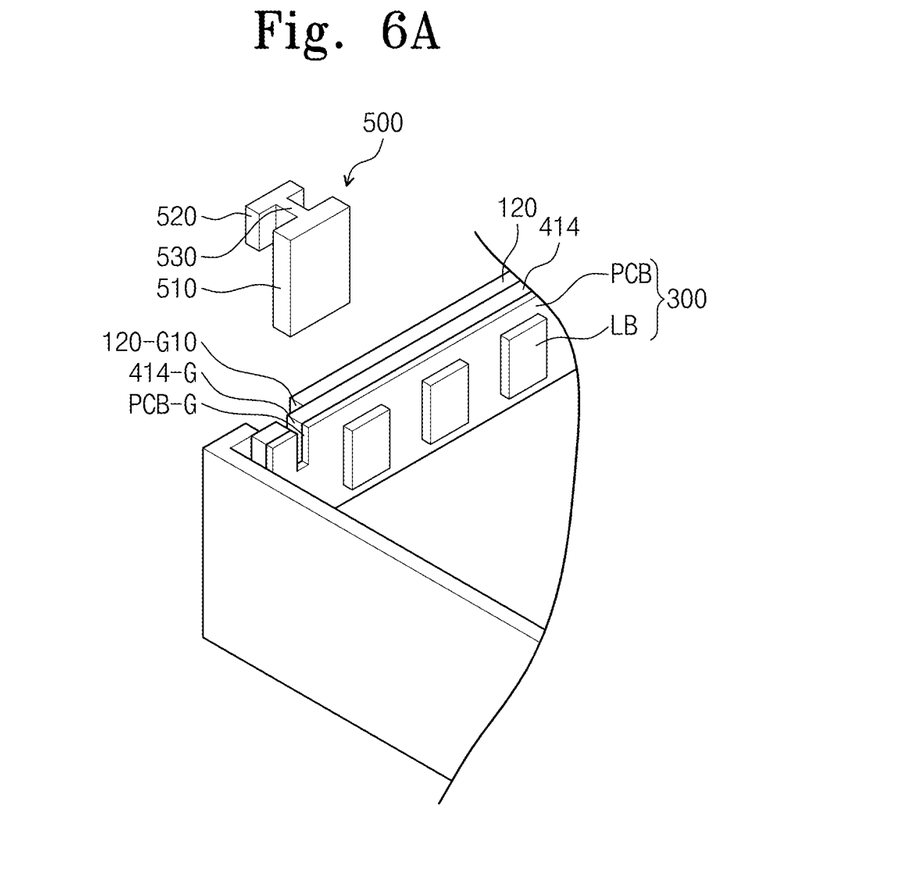
FIGS. 6A through 6C are enlarged drawings of part of the display device in accordance with some embodiments.
Figure 6B:
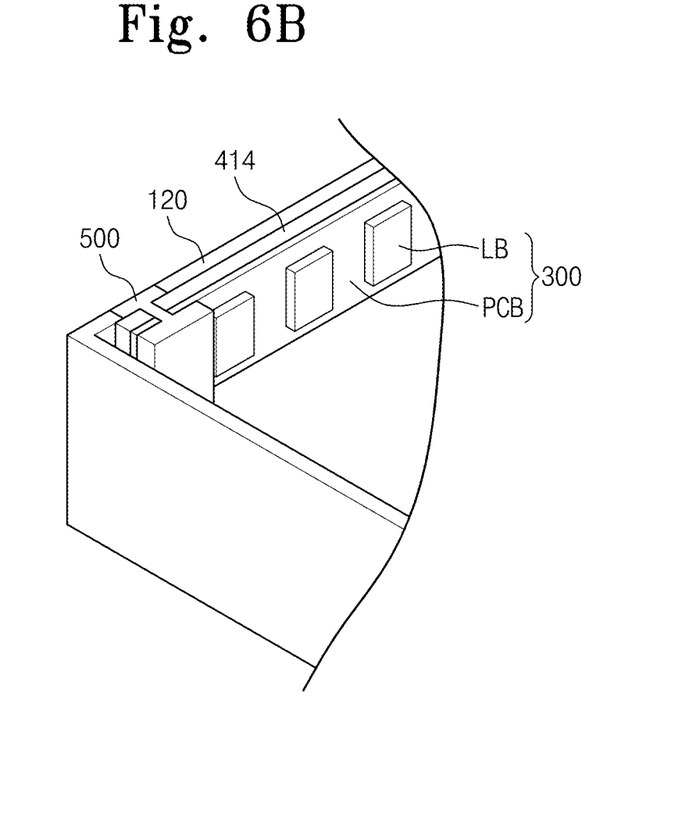
Figure 6C:
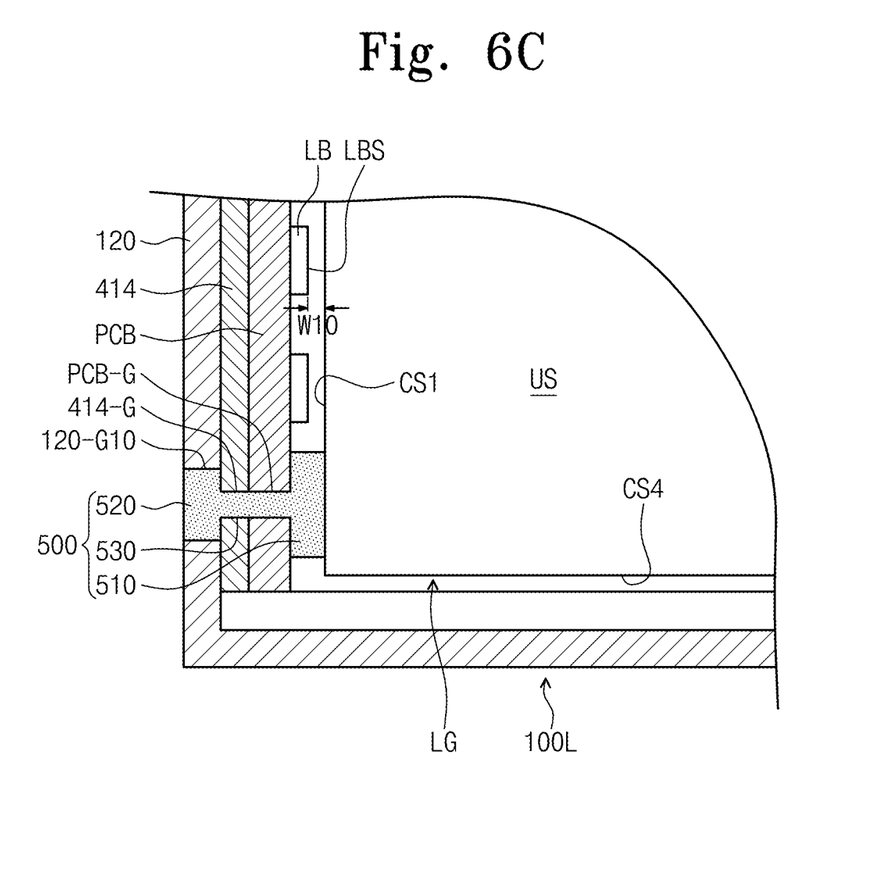

FIGS. 6A through 6C are enlarged drawings of portions of the display device in accordance with some embodiments.

As illustrated in FIGS. 6A through 6C, an external surface of the second sidewall portion 414 (the surface facing away from light guide LG) is in contact with an internal surface of the first sidewall portion 120 (the surface facing toward the light guide LG). The printed circuit board PCB is in contact with an internal surface of the second sidewall portion 414. The contact portion 510 is in contact with the light input surface CS1 and one surface of the printed circuit board PCB. A space W10 between the light input surface CS1 and the light output surfaces LBS of the plurality of light emitting blocks LB is uniformly maintained by the contact portion 510.

The first insertion groove 120-G10, the second insertion groove PCB-G and the third insertion groove 414-G are arranged in a row. Shapes of the second insertion groove PCB-G and the third insertion groove 414-G are identical to each other. The first insertion groove 120-G10 has a different shape from those of the second insertion groove PCB-G and the third insertion groove 414-G. The positions of the contact portion 510 with respect to the fixing portion 520 for the spacing member 500 does not change while the spacing member 500 is inserted in the first insertion groove 120-G10, the second insertion groove PCB-G and the third insertion groove 414-G.

The connection portion 530 is inserted into the second insertion groove PCB-G and the third insertion groove 414-G. The fixing portion 520 is inserted into the first insertion groove 120-G10. Shapes of the fixing portion 520 and the first insertion groove 120-G10 match each other, so that the fixing portion 520 fits within the first insertion groove 120-G10. The fixing portion 520 and the first sidewall portion 120 have the same thickness. Thus, the fixing portion 520 does not protrude from the first sidewall portion 120.

Figure 7:
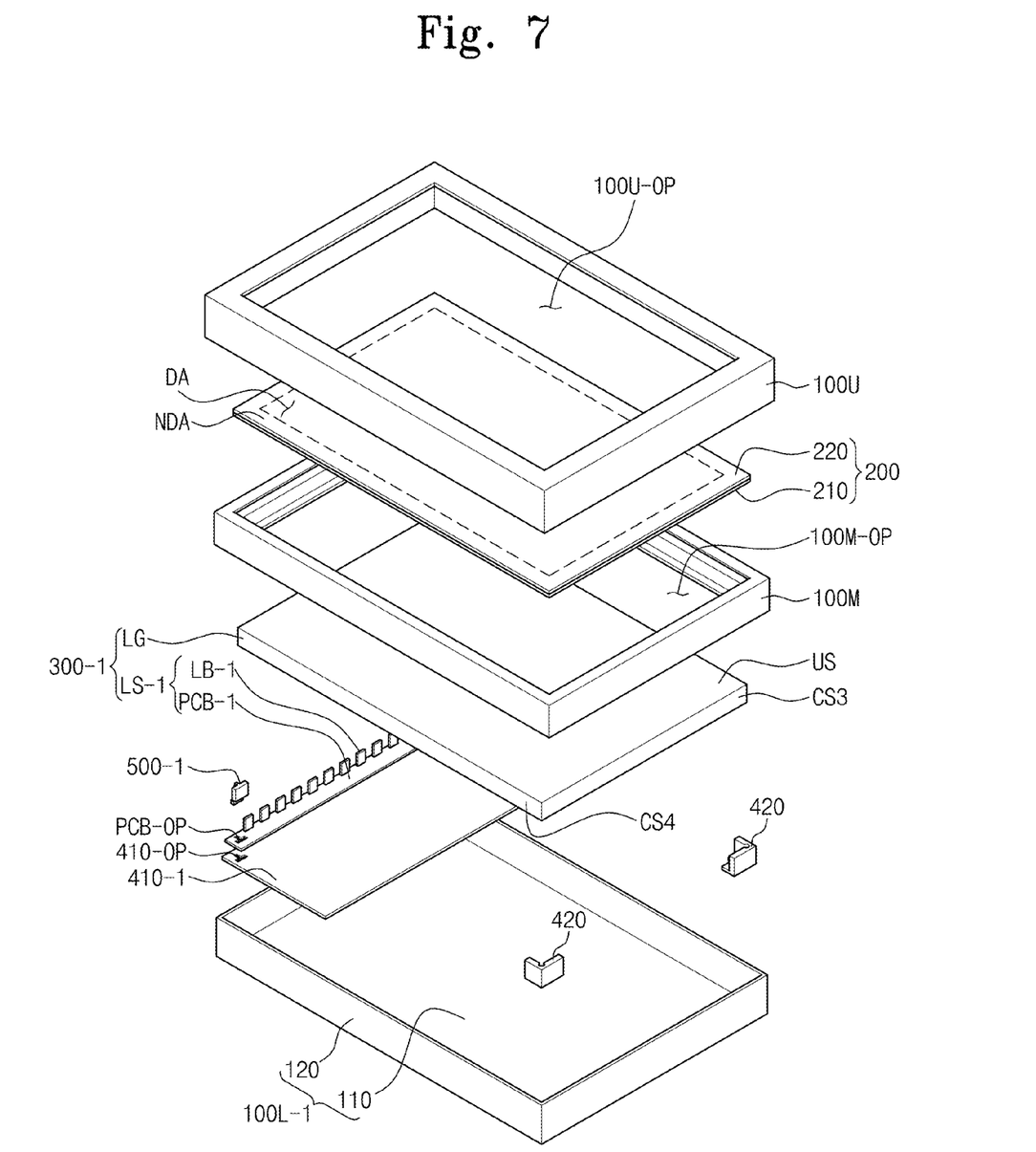
FIG. 7 is a through perspective view of display device in accordance with some other embodiments.
Figure 8:
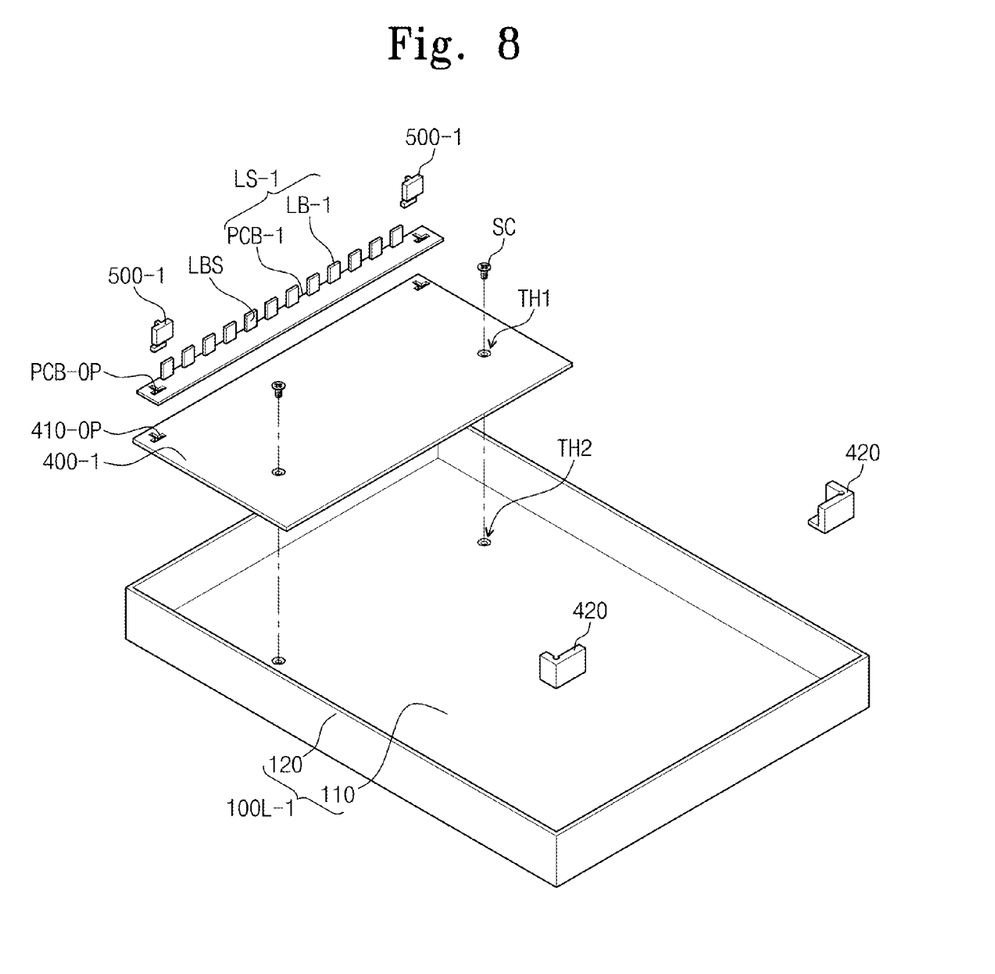
FIG. 8 is a through perspective view of some parts of the display device illustrated in FIG. 7.

FIG. 7 is a perspective view of display device in accordance with some other embodiments. FIG. 8 is a perspective view of some parts of the display device illustrated in FIG. 7.

As illustrated in FIGS. 7 and 8, the display device includes a protection member (100U, 100L-1), a display panel 200, a backlight unit 300-1, a support member (410-1, 420) and a spacing member 500-1.

The protection member (100U, 100L-1) includes an upper protection member 100U and a lower protection member 100L-1 that combine with each other. The upper protection member 100U and the lower protection member 100L-1 form an external surface of the display device and accommodate other constituent elements therein.

The lower protection member 100L-1 is disposed at a lower side of the display panel 200. The lower protection member 100L-1 includes a bottom portion 110 and a sidewall portion 120 upwardly bent from the bottom portion 110. A shape of the bottom portion 110 may be, for example a square or a rectangle. The sidewall portion 120 is upwardly bent from four sides of the bottom portion 110.

The backlight unit 300-1 includes a light source LS-1 generating light and a light guide LG guiding the light received from the light source LS-1 to the display panel 200.

The light source LS-1 includes a printed circuit board PCB-1 and a plurality of light emitting blocks LB-1 mounted on the printed circuit board PCB-1. The plurality of light emitting blocks LB-1 are connected to interconnections of the printed circuit board PCB-1 respectively.

The printed circuit board PCB-1 is disposed on the bottom portion 110 of the lower protection member 100L-1. The printed circuit board PCB-1 extends in a first direction D1 along a light input surface CS1 of the light guide LG. The printed circuit board PCB-1 includes at least one opening PCB-OP (hereinafter it is referred to as first opening). As illustrated in FIGS. 7 and 8, the two first openings PCB-OP may be disposed at both ends of the printed circuit board PCB-1.

Each of light output surfaces LBS of the plurality of light emitting blocks LB is perpendicular to one surface (for example, a surface with the greatest area) of the printed circuit board PCB-1. As will be described later, the light output surfaces LBS perpendicular to one surface of the printed circuit board PCB-1 can provide light to the light input surface CS1 of the light guide LG even when the printed circuit board PCB-1 is disposed on the first support member 410-1.

The support member (410-1, 420) includes the first support member 410-1 and a second support member 420. The first support member 410-1 is disposed on the bottom portion 110 of the lower protection member 100L-1. The first support member 410-1 may be a plate of square shape. The first support member 410-1 supports the printed circuit substrate PCB-1.

The first support member 410-1 includes at least one opening 410-OP (hereinafter it is referred to as a second opening). The second opening 410-OP overlaps and is aligned with the first opening PCB-OP. The second opening 410-OP may have the same shape as that of the first opening PCB-OP. The first support member 410-1 may include two second openings 410-OP disposed in positions that correspond to the positions of the two first openings PCB-OP.

The spacing member 500-1 uniformly maintains the space between the plurality of light emitting blocks LB and the light input surface CS1 of the light guide LG. A part of the spacing member 500-1 is inserted into the first opening PCB-OP and the second opening 410-OP.

Figure 9:
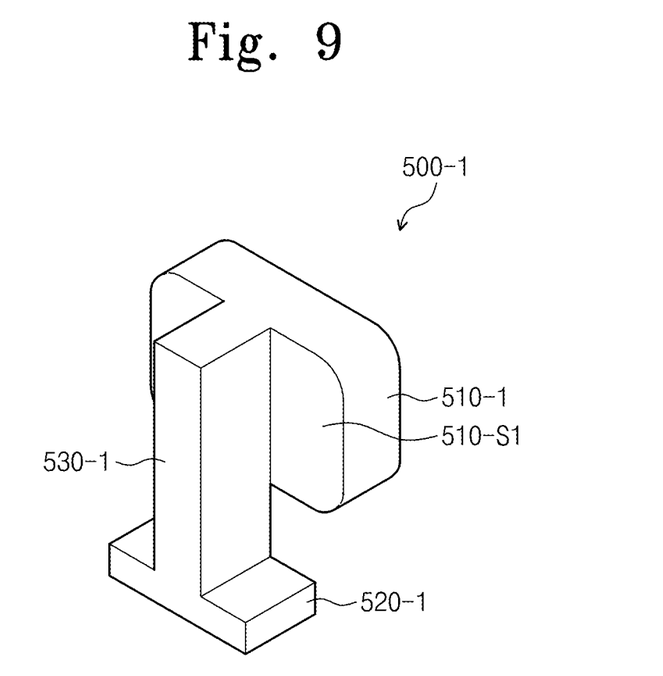
FIG. 9 is a perspective view of spacing member in accordance with some other embodiments.

FIG. 9 is a perspective view of a spacing member in accordance with some other embodiments. As illustrated in FIG. 9, the spacing member 500-1 includes a contact portion 510-1, a fixing portion 520-1 and a connection portion 530-1 connecting the contact portion 510-1 and the fixing portion 520-1. The spacing member 500-1 may be formed of, for example, poly carbonate, plastic such as poly urethane or silicon.

The contact portion 510-1 includes a contact surface (not shown) that is in contact with the light input surface CS1 and a facing surface 510-S1 facing the contact surface. One side of the connection portion 530-1 is connected to the facing surface 510-S1 of the contact portion 510-1 and the other side of the connection portion 530-1 protrudes from the facing surface 510-S1.

The fixing portion 520-1 is connected to an end of the other side of the connection portion 530-1 (the side not connected to the contact portion 510-1). A shape of the connection portion 530-1 may be, for example, a square pillar. A side surface of the connection portion 530-1 of a square pillar shape is connected to the facing surface 510-S1 of the contact portion 510-1 and a bottom surface of the square pillar shaped connection portion 530-1 is connected to the fixing portion 520-1. The connection portion 530-1 may have a cylinder shape or a polygonal pillar shape.

Figure 10A:
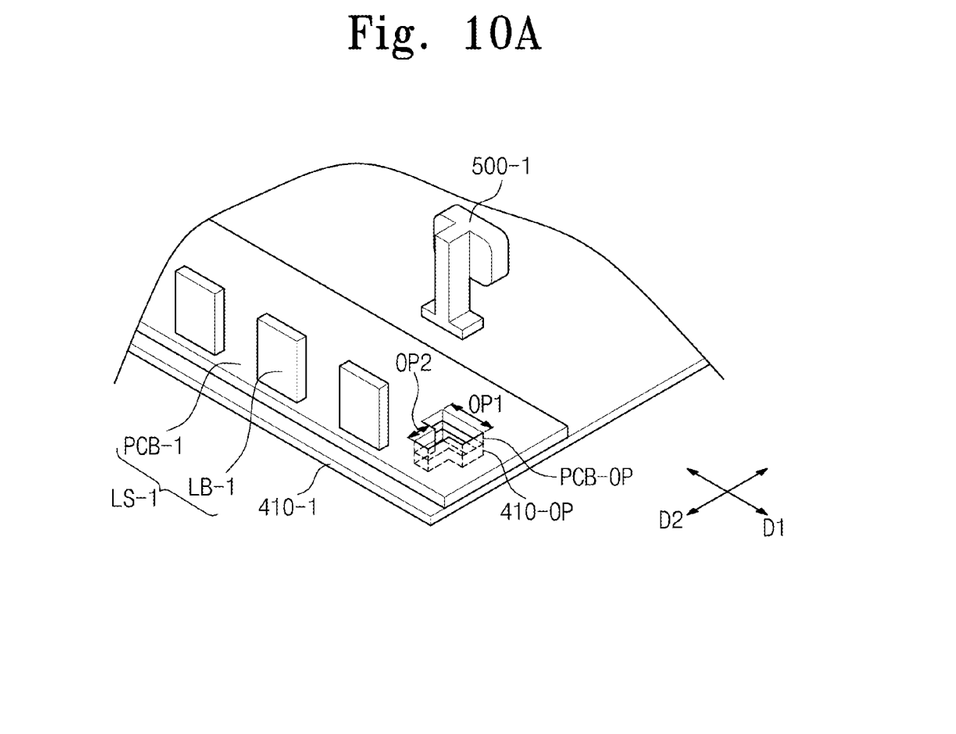
FIGS. 10A and 10B are enlarged drawings of part of the display device in accordance with some other embodiments.
Figure 10B:
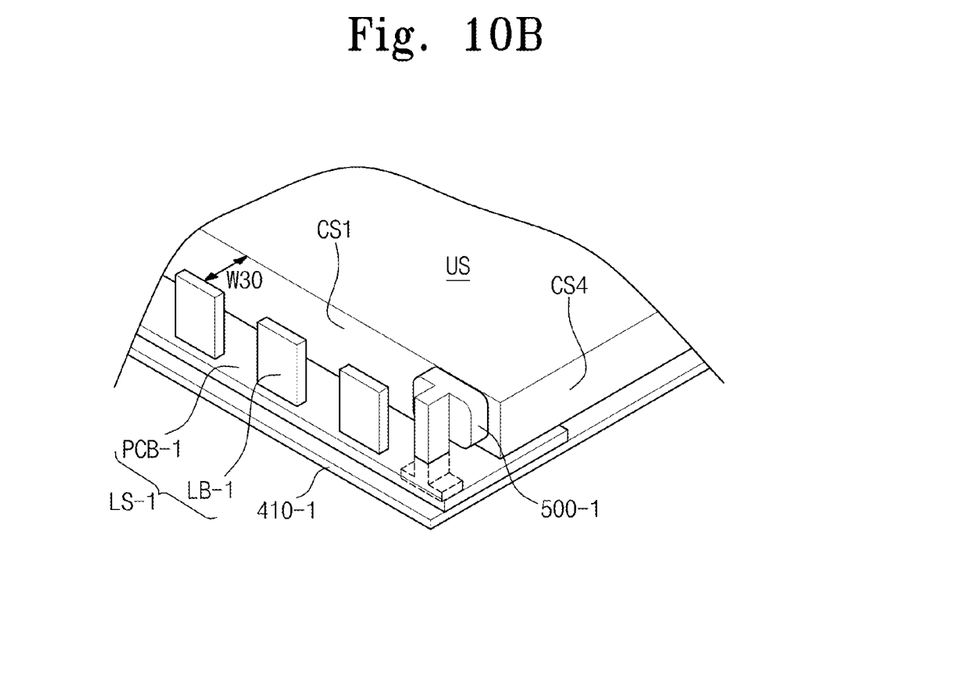

FIGS. 10A and 10B are enlarged drawings of part of the display device in accordance with some other embodiments. FIG. 10A illustrates a state of the display device before the spacing member 500-1 is inserted into the first opening PCB-OP and the second opening 410-OP. FIG. 10B illustrated a state of the display device in which the spacing member 500-1 is inserted into the first opening PCB-OP and the second opening 410-OP.

As illustrated in FIG. 10A, the first opening PCB-OP overlaps the second opening 410-OP. Each of the first opening PCB-OP and the second opening 410-OP includes a first part OP1 and a second part OP2. The first part OP1 is a part extending in a first direction D1 and the second part OP2 is a part extending in a second direction D2.

The spacing member 500-1 is inserted into the first part OP1 so that the fixing portion 520-1 is disposed at a lower side of the first support member 410-1. After that, the spacing member 500-1 moves so that the connection portion 530-1 is located at the second part OP2. As illustrated in FIG. 10B, the contact portion 510-1 is disposed at an upper side of the printed circuit board PCB-1 and the fixing portion 520-1 is disposed at a lower side of the first support member 410-1. The connection portion 530-1 is located in the second part OP2 of the first opening PCB-OP and the second opening 410-OP.

The contact surface of the contact portion 510-1 is in contact with the light input surface CS1. A space W30 between light output surfaces LBS of the light emitting blocks LB and the light input surface CS1 is uniformly maintained by the contact portion 510-1.

The spacing member 500-1 applies pressure to the printed circuit board PCB-1 and the first support member 410-1. Thus, the printed circuit board PCB-1 is pressed against the first support member 410-1. Without using a separate adhesive, the printed circuit board PCB-1 can be fixed to the first support member 410-1.

As described above, spaces between the light output surfaces of the plurality of light emitting blocks and the light input surface of the light guide are uniformly maintained by the spacing member. Distances between the light output surfaces and the light input surface are identical to each other. Thus, the light guide receives uniform light regardless of areas thereof.

The light guide that received uniform light provides uniform light to the display panel regardless of areas thereof. The display panel that received uniform light generates an image of uniform brightness.

The second support member fixes the light guide to a certain location. Even when an external impact is applied to the display device, spaces between the light output surfaces and the light input surface are uniformly maintained.

Having described the exemplary embodiments, it is further noted that it is apparent to those of ordinary skill in the art that various modifications may be made without departing from the spirit and scope of the present disclosure, including the appended claims.

What is claimed is:

1. A display device comprising:
a light source including a printed circuit board including two of first insertion grooves and first to n light emitting blocks mounted on an upper surface of the printed circuit board in order, wherein two of the first insertion grooves face each other so that the first to n light emitting blocks are disposed between the two of the first insertion grooves, and wherein n is a positive integer;
a light guide guiding light received from the light source;
a display panel receiving the guided light from the light guide to generate an image;
a first support member including a first bottom portion and a first sidewall portion that is bent from the first bottom portion, wherein the first bottom portion extends from the first sidewall portion to underneath the light guide and is planar from the first sidewall portion to the light guide, and the first sidewall portion includes two of second insertion grooves wherein each of the second insertion grooves overlaps each of the first insertion groove;
a protection member comprising a second bottom portion supporting the first bottom portion, and a second sidewall portion that is bent from the second bottom portion and has two of third insertion grooves, wherein each of the third insertion grooves overlaps each of the second insertion grooves; and
two spacing members spaced apart from each other, each of the spacing members including a portion that is inserted into one of the first insertion grooves, one of the second insertion grooves and one of the third insertion grooves overlapped with each other, each of the spacing member uniformly maintaining spaces between light output surfaces of the light emitting blocks and a light input surface of the light guide,
wherein each of the spacing members includes a contact portion which is in contact with the light input surface and the upper-surface of the printed circuit board, a connection portion which is connected to the contact portion and inserted into one of the first insertion grooves, one of the second insertion grooves, and one of the third insertion grooves overlapped with each other, and a fixing portion connected to the connection portion, and
wherein the fixing portion protrudes from the second sidewall portion of the protection member.

2. The display device of claim 1, wherein a shape of the contact portion is different from a shape of the fixing portion.

3. The display device of claim 1, wherein the fixing portion is inserted into corresponding one of the third insertion grooves.

4. The display device of claim 3, wherein a thickness of the fixing portion is the same as a thickness of the first sidewall portion.

5. The display device of claim 3, wherein a shape of the fixing portion is matches a shape of the third insertion groove.

6. The display device of claim 1, wherein each of the light output surfaces of the light emitting blocks is parallel to the upper surface of the printed circuit board that faces the light input surface of the light guide.

7. The display device of claim 1, further comprising a second support member which is disposed between the light guide and the protection member to support the light guide and uniformly maintains a space between the light guide and the protection member.

8. The display device of claim 7, wherein a part of the second support member is in contact with a light facing surface of the light guide facing the light input surface.

9. The display device of claim 7, wherein the second support member comprises urethane or silicon.

10. The display device of claim 1, wherein the spacing member comprises poly carbonate.

* * * * *